(12) United States Patent
Bianchi

(10) Patent No.: US 9,458,906 B2
(45) Date of Patent: Oct. 4, 2016

(54) SUSPENSION METHOD AND SHOCK-ABSORBING DEVICE FOR AN AUTOMOBILE

(75) Inventor: Mauro Bianchi, Aix En Provence (FR)

(73) Assignee: Astron Flamm Safety (FR)

( * ) Notice: Subject to any disclaimer, the term of this patent is extended or adjusted under 35 U.S.C. 154(b) by 64 days.

(21) Appl. No.: 14/232,420

(22) PCT Filed: Jul. 4, 2012

(86) PCT No.: PCT/EP2012/063030
§ 371 (c)(1),
(2), (4) Date: Mar. 31, 2014

(87) PCT Pub. No.: WO2013/007572
PCT Pub. Date: Jan. 17, 2013

(65) Prior Publication Data
US 2014/0291087 A1    Oct. 2, 2014

(30) Foreign Application Priority Data

Jul. 11, 2011 (FR) ..................... 11 56289

(51) Int. Cl.
*F16F 9/44* (2006.01)
*F16F 9/22* (2006.01)
(Continued)

(52) U.S. Cl.
CPC ............. *F16F 9/22* (2013.01); *F16F 9/065* (2013.01); *F16F 9/49* (2013.01); *F16F 9/516* (2013.01)

(58) Field of Classification Search
USPC ............ 188/282.4, 282.8, 289, 314–318; 280/124.154
See application file for complete search history.

(56) References Cited

U.S. PATENT DOCUMENTS 2,630,887 A * 3/1953 Paquin ................... 188/300
3,647,239 A * 3/1972 Katsumori ............ 280/124.154
(Continued)

FOREIGN PATENT DOCUMENTS

FR    2773599    7/1999
JP    62-170846    10/1987
(Continued)

OTHER PUBLICATIONS

PCT/ISA/237 Written Opinion issued on PCT/EP2012/063030 (9 pp.).
(Continued)

*Primary Examiner* — Christopher Schwartz
(74) *Attorney, Agent, or Firm* — The Farrell Law Firm, P.C.

(57) ABSTRACT

The present invention relates to a suspension method and to a shock-absorbing device for an automobile in the broadest sense of the term, i.e. any vehicle having a suspension and moving under its own power. Said shock-absorbing device includes a damping assembly (1) having, on the inside thereof, a piston (2) connected to a rod (17), the piston (2) and the rod (17) combined therewith being movable, in both the compression and expansion direction, about a static position inside the damping assembly (1) in order to provide a shock-absorbing function, the inside of the damping assembly (1) being filled with a hydraulic fluid, characterized in that said assembly (1) engages with a means for varying the damping effect so as to produce: a compression phase consisting of a compression sub-phase, directed from the static position toward the maximum compression position of the piston (2), and of an expansion sub-phase, directed from said maximum compression position toward the static position, respectively, and an expansion phase consisting of an expansion sub-phase, directed from the static position toward the position of maximum expansion of the piston (2), and of an expansion sub-phase, directed from said maximum position toward the static position, respectively, the means for varying the damping elect controlling the damping assembly such that the damping value of the compression sub-phase of the compression phase and/or the expansion sub-phase of the expansion phase is different from the damping value of the expansion sub-phase of the compression phase and the compression sub-phase of the expansion phase, respectively. According to the invention, provided is a step of modifying the damping value with separate values for the compression direction as well as for the expansion direction for each of the work sectors of the shock absorber depending on whether the work is being carried out between the static position of the suspension and the fully compressed position, or between the static position of the suspension and the fully expanded position.

19 Claims, 8 Drawing Sheets

Figure 1:
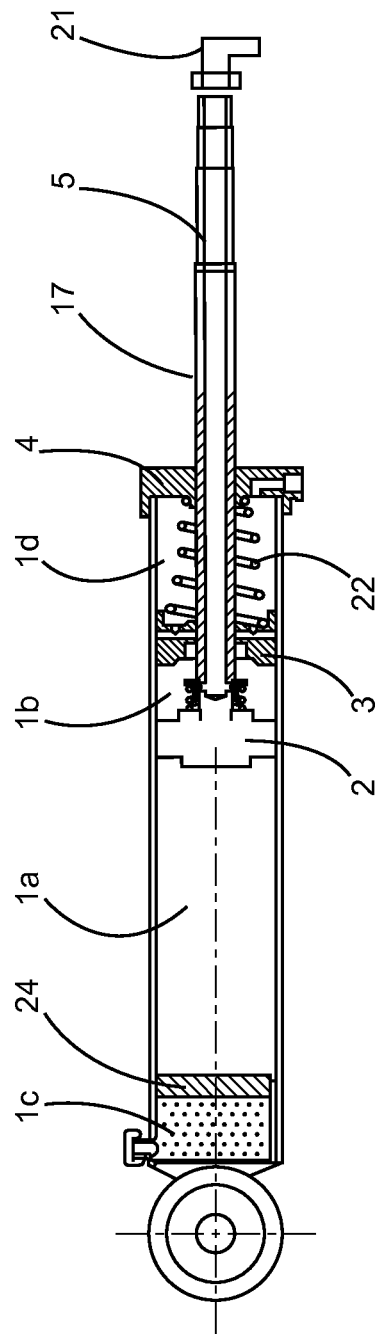

(51) Int. Cl.
*F16F 9/06* (2006.01)
*F16F 9/49* (2006.01)
*F16F 9/516* (2006.01)

(56) References Cited

U.S. PATENT DOCUMENTS

| | | | | |
|---|---|---|---|---|
| 3,853,311 | A | * | 12/1974 | Kreuzer et al. ............ 267/64.26 |
| 5,174,603 | A | * | 12/1992 | Lund .......................... 188/266.2 |
| 5,452,919 | A | * | 9/1995 | Hoyle ............... B60G 17/0155 280/5.505 |
| 5,485,417 | A | * | 1/1996 | Wolf ................... B60G 17/018 280/124.102 |
| 6,311,961 | B1 | * | 11/2001 | Julia .......................... 267/64.17 |
| 8,479,894 | B2 | * | 7/2013 | Yabe .......................... 188/282.8 |
| 2001/0025753 | A1 | | 10/2001 | Pfundstein et al. |
| 2002/0130453 | A1 | | 9/2002 | Roper |
| 2009/0138157 | A1 | | 5/2009 | Hagglund et al. |
| 2010/0044975 | A1 | * | 2/2010 | Yablon ................... B60G 11/27 280/5.503 |
| 2010/0059321 | A1 | * | 3/2010 | Boivin ..................... F16F 9/49 188/284 |
| 2010/0163357 | A1 | * | 7/2010 | Hunter ................... B60G 11/15 188/319.2 |
| 2011/0202236 | A1 | * | 8/2011 | Galasso ................. B62K 25/04 701/37 |
| 2015/0021131 | A1 | * | 1/2015 | Wootten ................. F16F 9/512 188/280 |

FOREIGN PATENT DOCUMENTS

| | | |
|---|---|---|
| JP | 62170846 | 10/1987 |
| JP | 62-286817 | 12/1987 |
| JP | 02-026335 | 1/1990 |
| WO | WO-02095260 | 11/2002 |

OTHER PUBLICATIONS

PCT/ISA/220 (3 pp.).
Japanese Office Action dated May 23, 2016 issued in counterpart application No. 2014-519499, 13 pages.

\* cited by examiner

SUSPENSION METHOD AND SHOCK-ABSORBING DEVICE FOR AN AUTOMOBILE

PRIORITY

This application is a U.S. National Phase application of International Application No. PCT/EP2012/063030 filed Jul. 4, 2012, claiming priority to Application No. 1156289 filed with the French Intellectual Property Office on Jul. 11, 2011, the content of each of which is incorporated herein by reference.

The present invention relates to a suspension method and a damping device with a damping assembly intended for any type of automobile vehicle, comprising Q-cycles, racing or sports cars, motorcycles, ATVs, trucks and/or trailers.

The applicant of the present patent application has already filed several patent applications based on the so-called Contractive® concept relating to a damping assembly provided with two different stiffness levels, which are centred about the static position of the vehicle with a compression phase and an expansion phase. This is more particularly described in document WO-A-91/04876 which shows a damping assembly in which stiffness during the expansion stroke can be significantly higher than that of said assembly during the compression stroke with a ratio of about 1 to 3.

Document FR-A-2664210 discloses an improvement for such a damping assembly by providing a flexible connection inserted between the zone of linear stiffness of the expansion phase and that of the compression phase in order to avoid too abrupt a transition between these. It was found that if the adoption of the flexible connection significantly improves the comfort of a vehicle equipped with such damping assemblies, discomfort significantly increases when the stress on the expansion stroke of the damping assembly goes beyond the connecting zone.

Such a damping assembly according to the Contractive® concept has demonstrated its relevance both in the field of competition and in that of mass-produced cars. However, such a damping assembly has some drawbacks.

A first disadvantage is that such an assembly has overall dimensions that may require the extension thereof in order to accommodate the return assembly guaranteeing two distinct stiffness levels for compression and expansion phases.

A second disadvantage is the need to insert an elastomeric element inside the damping assembly, which results in significant reliability issues, the elastomeric member having difficulty keeping its mechanical quality in a very hot environment and in the hydraulic fluid present within the assembly, a fluid may be corrosive.

A third disadvantage is that an assembly with two stiffness levels mounted on mass-produced vehicles that are exposed to widely varying loads meets a problem of degradation of the trim control according to the vehicle load. However, this problem also partly exists in conventional damping assemblies.

Finally and most importantly, a fourth disadvantage is that the use of two phases with very different stiffness levels requires a damping calibration specific to each phase, which could not be obtained so far by a damping assembly of the type used for the Contractive® concept. Thus, if the comfort provided by the vehicles equipped with damping assemblies of the Contractive® type can be considered as satisfactory, or even excellent on the road unevenness causing the compression of at least one present damping assembly, when the stress on the damping assembly is in the expansion direction and goes beyond the connection zone, the comfort is very significantly degraded.

Thus, for a damping assembly of the Contractive® type, the damping values in the expansion phase and in the compression phase result from a compromise which must simultaneously satisfy two fully different stiffness levels, which results in an imperfect relationship between stiffness and damping.

Providing a third stiffness called a connection stiffness and intended to very progressively smooth the switching from a low stiffness to a very high stiffness helped make the behaviour and comfort acceptable, but this technique quickly reaches its limits when the road unevenness increases the stress on the suspension in the stroke sector of the damping assembly located between the static position and the end of the expansion stroke.

The aim of the present invention is to reduce all or part of the above-mentioned drawbacks.

One aspect of the invention relates to a damping device comprising a damping assembly having on the inside thereof a piston connected to a rod, the piston and the rod combined therewith being movable both in compression and in expansion about a static position within the damping assembly to provide a damping function, the inside of the damping assembly being filled with a hydraulic fluid, characterized in that said assembly engages with a means for varying the damping effect in order to produce: a compression phase consisting of a compression sub-phase directed from the static position toward the position of maximum compression of the piston and of an expansion sub-phase directed from said maximum compression position toward the static position, respectively and an expansion phase consisting of an expansion sub-phase directed from the static position toward the position of maximum expansion of the piston and an expansion sub-phase directed from said maximum position toward the static position respectively, the means for varying the damping effect controlling the damping assembly so that the damping value of at least one of the compression sub-phase of the compression phase and the expansion sub-phase of the expansion phase is different from the damping value of the expansion sub-phase of the compression phase and the compression sub-phase of the expansion phase, respectively.

While the current techniques only try to adjust the stiffness and the damping along the piston stroke, the invention uses an adjustment according to the direction of the piston motion. Thus, if it moves downwards, damping may be different from an upward mobility, even within the same stroke sector.

According to the invention, a damping assembly is preferably provided having on the inside thereof a piston connected to a rod, the piston and its combined rod being movable in both the compression and expansion direction, about a static position inside the damping assembly to provide a damping function, the inside of the damping assembly being filled with a hydraulic fluid, characterized in that said assembly engages with an expansion module, the expansion module controlling the damping assembly in order to modify both the value of stiffness and that of damping for the stroke sector of the suspension from the static position to the fully expanded position corresponding to the expansion phase of the suspension.

The inventive approach linked to the present invention consists in completely reconsidering the damping of a damping assembly not as the closest state of the prior art, taking into account two phases as a whole, i.e. the complete phases of compression and expansion, but in considering sub-phases in such phases.

Because of their architecture, the traditional suspensions are provided with a damping effect in the compression direction, i.e. from the fully expanded position to the fully compressed position of the suspension stroke and in the expansion direction, i.e. from the fully compressed position up to the fully expanded position.

Positive frictions are created in the damping devices. On the contrary, interfering frictions exist and it is known that all the engineers developing suspensions are trying to minimize such dry frictions so as not to pollute the suspension dynamic operation and comfort. Now, it was found that having to choose a single damping value for the entire suspension stroke affects the operation.

When a suspension is operating, from the starting point of a suspension at rest or in static position, when the suspension is exposed to a load, it will compress and at the end of this compression phase, such additional charge will fade. The role of the damping device will then be to slow the return of the suspension to the static position, which requires a damping effect in the expansion direction. Conversely, still taking a suspension at rest or in a static position as the starting point, when the suspension is exposed to a decrease in its load, it will decompress and at the end of the decompression phase, when such load decrease will fade, the role of the damping device will be to slow the return of the suspension to the static position, which requires a damping effect in the compression direction.

Thus, when the suspension compresses under the effect of a varying load, it will have to overcome the resistance of the suspension spring and the braking or the friction resulting from the damping, which affects the dynamics and more particularly the comfort of the suspension. This situation is exactly the same in the opposite case, when the load variation causes the decompression of the lift spring of the vehicle. Again, the suspension must overcome both the mass of the vehicle and the braking or friction resulting from the damping. Damping during the compression phase then must slow the return to the static position with a necessarily limited value, which affects the dynamics and especially the comfort of the suspension.

In summary, for a traditional damping in the compression direction, starting from the fully expanded position of the suspension up to the rest or static position, braking or strong damping is required, whereas, while following its stroke from the rest or static position up to the fully compressed position, the damping effect should be reduced or even eliminated which would result in a better comfort and better dynamics in operation.

The invention proposes to vary the damping effect according to the compression gradient: if positive, a first damping value will be applied, if negative, a second value will be used. The same is true for the expansion.

The same observations can be transposed to the expansion direction. This explains why a single damping, in the compression direction as well as in the expansion direction, can not be considered but as a compromise, far from being optimized.

The damping strategy of the present invention provides that the compression phase will be split into two compression sub-phases and/or that the expansion phase will be split into two expansion sub-phases having distinct values, hence the name EVO-AVS 4 (four Separate Values Damping).

Then four different damping values are provided for the four work phases instead of two damping values for the same four work phases.

Thus, the solution according to the state of the art, called the Contractive solution, despite undeniable qualities concerning the dynamic operation, the excellent economic performances and the comfort, broadly found similar to the traditional solution, with such comfort being considered sometimes a little better, sometimes a little worse depending on the characteristics of the road, could not prevail in the field of mass-prolineion, which is thus still more penalized by a traditional damping than a suspension using traditional linear stiffness and stabilizer bars.

Indeed, it was not planned so far to adjust damping, according to so different actual stiffness during the various sub-phases, and the damping provided so far could be nothing but a compromise having the same value for such sub-phases having the same compression or expansion direction.

The advantages provided by the invention in terms of damping strategy can be operated with a traditional or pseudo-traditional suspension that would use a Δ of symbolic stiffness while taking advantage of an optimized damping.

It is advantageous to provide for a technical solution without relocating the expansion module assembly since a solution of this type may have be interesting in some cases.

According to the present invention, with an expansion module for the damping assembly, it is possible to provide a stronger or weaker damping value according to the relevant sub-phase. It is therefore possible to adopt, for each sub-phase, both during an expansion or a compression phase, an optimized damping in the expansion direction as well as in the compression direction.

The damping device according to the invention may also optionally provide at least one of the following characteristics:

Advantageously, a compression phase consisting respectively of a compression sub-phase from the static position to the position of maximum compression of the piston of the piston and an expansion sub-phase from said maximum position toward a static phase and an expansion phase consisting respectively of an expansion sub-phase from the static position toward the position of maximum expansion of the piston and an expansion sub-phase from said maximum position toward the static position, the expansion module controls the damping assembly in order to modify the damping value, in addition to its effect on the suspension stiffness, for one or several sub-phases.

Advantageously, the damping assembly comprises a floating piston positioned on the rod of the damping device between the piston and the end of the assembly through which said rod comes out, said end being called an upper closure, said floating piston being movable along said rod and defining with said closure an inner chamber in the damping assembly, the position of the floating piston affecting the pressure of the hydraulic fluid in said inner chamber by modifying the value of the stiffness and the damping of the damping assembly accordingly.

Advantageously, the expansion module is located outside said assembly, said expansion module being in fluid communication with said inner chamber, the floating piston comprising a channel for the communication of said expansion module with said inner chamber and said floating piston being kept at a distance from said closure of the assembly through the return action of a return spring. Thus a damping assembly originally provided can perform the work of a damping assembly according to the invention, with the appropriate modification of the installation of a floating piston in said damping assembly and provision of a fluid passage between the damping assembly and the expansion module. The relocation of the expansion module then makes it possible to optimally adjust the value of damping, depending on the choice of the persons skilled in the art and depending on the current sub-phase, this for the four sub-phases of the operation of the damping assembly. In addition, the expansion module can thus be readily standardized and become common to all types of vehicles, except for some of its components like the return spring or the link stop, the parameters of which, such as stiffness, the curve of the stop and the damping value, depend on the characteristics of the vehicle to be equipped. This significantly lowers the cost of industrial prolineion of such an expansion module.

Advantageously, the fluid communication enabling the control of the module is via an inner channel going through the damping assembly through the upper closure thereof and providing communication between the inner chamber and the expansion module, wherein the inner line leading to at least one opening between the piston head and the floating piston, a valve blocking said opening so long as the piston head does not rest against the floating piston and, when the piston head rests against the floating piston, the channel of the floating piston is located opposite said inner line, the valve having been pushed to the opening position, upon the piston head resting on the floating piston.

The action of said valve is very advantageous and enables the damping function between the fully compressed position and the rest position in the expansion direction, the floating piston being kept stationary by the incompressibility of the fluid. The relocation of the expansion module connected to the damping assembly by a hydraulic line makes it possible to increase the standardization of the expansion module and to provide multiple opportunities for positioning the expansion module in the vehicle.

Advantageously, the inner line extends within the rod, longitudinally to said rod, with the valve blocking said opening being carried by the rod and protruding laterally from said rod and being slidable on said rod, said valve being returned by an elastic means, for example a spring, in the position thereof obstructing said opening of the inner line.

Advantageously, the expansion module has an inlet for the passage of the hydraulic fluid expelled from the inner chamber of the damping assembly, with said admission of the fluid into the expansion module acting on a power piston compressing the return spring via a link stop.

The diameter of the piston may, according to the choice of the persons skilled in the art, be smaller than the diameter of the main piston of the damping device. This enables a gear reduction ratio which lengthens the expansion stroke at the expansion module thus providing a significant improvement in the damping control and the zone corresponding to the connection flexibility.

Advantageously, the expansion module comprises a chamber supplied with fluid, under the control of a solenoid valve, with said chamber being subjected to the action of a spring or a gas charge opposing the admission in the expansion module of the fluid from the damping assembly.

The device may comprise a first floating piston whereon the return spring rests through the link stop, a second floating piston being positioned behind a partition wall, which in turn is stationary relative to the module, and the second floating piston undergoing a constant pressure from an accumulator that transmits the pressure required for the correct positioning of the floating piston. This gives the possibility to optimize the damping assembly for the actual load of the automobile at a given time. Two chambers which can communicate through a line are created between the two floating pistons, separated by the fixed partition. This line is advantageously controlled by a solenoid valve. Then a possibility is provided to connect the solenoid valve with the device of the automatic closure of the existing doors or on the tachometer of the vehicle. The operation logic of this device is as follows: vehicle stopped, solenoid valve open, vehicle moving, solenoid valve closed.

Advantageously, the expansion module comprises at least one chamber supplied with hydraulic fluid controlled by a solenoid valve, with said chamber being subjected to the action of a spring or a gas charge opposing the admission into the expansion module of the fluid from the damping assembly.

Advantageously, the floating piston consists of three parts, with the contact of the piston head with the floating piston in three parts opening a passage for the fluid between two parts of said floating piston, with a return spring being provided on the other side of the floating piston in three parts than the side facing the piston in order to return the floating piston in three parts toward said piston.

Advantageously, a displacement sensor is provided which directly or indirectly measures the displacement values of the piston head, such values being transmitted to a computer managing the damping according to the values meeting the criteria of the invention which provides distinct damping in the expansion direction and in the compression direction for each one of the stroke sectors of the suspension from the fully compressed position up to the rest position and from the rest position up to the expansion position.

The damping assembly is advantageously an oleopneumatic damping assembly.

The present invention also relates to a system of at least two such damping devices, for which the expansion module is outside and common to the damping assemblies, with the expansion module having two independent parts, each one communicating with a respective damping assembly.

The invention also relates to an automobile, characterized in that it comprises at least one such damping device or a system of at least two damping assemblies. The adoption of such a damping device in an existing vehicle is substantially facilitated in that it is possible to keep the damping assemblies provided with the original architecture while providing appropriate modifications thereto, i.e. the positioning of a floating piston in the damping device and, for an expansion module located outside, an appropriate damping device rod or the creation of a communication channel for the damping assembly with the expansion module.

Advantageously, the expansion module is combined with at least one prestressing device controlling the automatic adjustment of the pre-stress of said expansion module according to the actual load of the automobile at the given time.

Advantageously, the prestressing device is automatically controlled by the automatic closing of the doors and/or the tachometer of the automobile.

The invention finally relates to a method for the suspension of a wheel of an automobile which comprises forming a compression phase consisting respectively of a compression sub-phase directed from the static position toward the position of maximum compression of the piston and an expansion sub-phase directed from said maximum position toward the static position, and an expansion phase consisting respectively of an expansion sub-phase directed from the static position to the position of maximum expansion of the piston and an expansion sub-phase directed from said maximum position toward the static position, characterized in that the damping value is selected to be different between the compression sub-phase and the expansion sub-phase of the compression phase and/or between the compression sub-phase and the expansion sub-phase of the expansion phase.

The invention uses such a damping assembly, said assembly being active about a static position in both a compression phase and an expansion phase, with the suspension stiffness or flexibility being different between the stroke sector of the suspension from the static position up to the fully compressed position and the stroke sector of the suspension from the static position up to the fully expanded position, a method wherein there is provided a step of varying the damping value with separate values for the compression direction as well as for the expansion direction for each work sector of the damping device, depending on whether such work is carried out between the static position of the suspension and the fully compressed position or between the static position of the suspension and the fully expanded position.

Thus, the present invention enables the implementation of a suspension damping adequately and independently managing the damping in the four sub-phases of the operation of the suspensions, by enabling to change the values of damping during the two sub-phases of each phase instead of, as mentioned in the prior art, providing an imperfect compromise taking into account only two phases, i.e. a single value in the compression phase and a single value in the expansion phase.

Advantageously, a compression phase consisting respectively of a compression sub-phase from the static position to the position of maximum compression of the piston and of an expansion sub-phase from said maximum position to the static position and an expansion phase consisting respectively of an expansion sub-phase from the static position to the position of maximum expansion of the piston and an expansion sub-phase from the position of maximum expansion of the piston to the static position, the step of modifying the damping value is provided during one or more sub-phases among a expansion sub-phase in the expansion phase, a compression sub-phase in the expansion phase and a compression sub-phase in the compression phase.

Advantageously, during the same compression or expansion phase, respectively, the damping value of the damping assembly for an action of the damping assembly between the static position and the maximum compression position or respectively the maximum compression position is different from the damping value for the reverse action.

Advantageously there is provided an adjustment of the damping assembly according to the load of the automobile at a given time.

Advantageously, the damping is electronically controlled.

Preferably, the invention can be implemented with the following options which can be used alternatively or in combination:

the damping assembly comprises a floating piston positioned on said rod between the piston and one end of the assembly, with said floating piston being movable along said rod and defining a first inner chamber directed toward said end in the damping assembly, the position of the floating piston affecting the hydraulic fluid pressure in said inner chamber;

the damping assembly comprises a sealing partition positioned between the piston and the floating piston and creating a second inner chamber between the floating piston and the partition;

the damping assembly comprises two chambers, preferably consisting of a third and a fourth chamber, between the piston and one end of the assembly and between the piston and a closing wall respectively;

the damping assembly wherein the closing wall is the partition, the damping device wherein the means for varying the damping comprises: a first fluid bypass circuit between the third chamber and the fourth chamber, said circuit comprising a valve so configured as to enable the passage of fluid in the circuit in a first direction of motion of the piston and to prohibit the passage of fluid in the circuit in a second direction of motion of the piston; a second fluid bypass circuit between the third chamber and the fourth chamber, said circuit comprising a valve so configured as to enable the passage of fluid in the circuit in the second direction of motion of the piston and to prohibit the passage of fluid in the circuit in the first direction of motion of the piston, a damping device wherein the first and second bypass circuits are delimited by the outer wall of a first cylinder the inner wall of which defines the chambers and by the inner wall of an additional cylinder.

a damping device wherein the first and second fluid bypass circuits each have an orifice leading to the chambers at the static position of the piston respectively;

a damping device wherein the first and second fluid bypass circuits each have an orifice each leading to the chambers at a predetermined distance from the end of the damping assembly and the closing wall respectively, a device wherein the piston comprises two valves each so configured as to enable the unidirectional passage of the fluid through the piston, these passages having opposite directions.

The implementation of this original damping strategy through the fluid mechanics may involve adapting suitable damping valves.

As a matter of fact, although it seems possible to reach the 4 different damping values relative to the 4 work semi-phases with a conventional valve, in practice the hydraulic connection between the damping device and the expansion module might entail a significant risk of cavitation, which would degrade the operation of the suspension.

To overcome this drawback, numerous opportunities exist within the scope of the invention.

An exemplary embodiment of a particular valve is disclosed hereunder and this example is not exhaustive. Other valves can be implemented to meet the criteria characterizing the invention.

Figure 2:
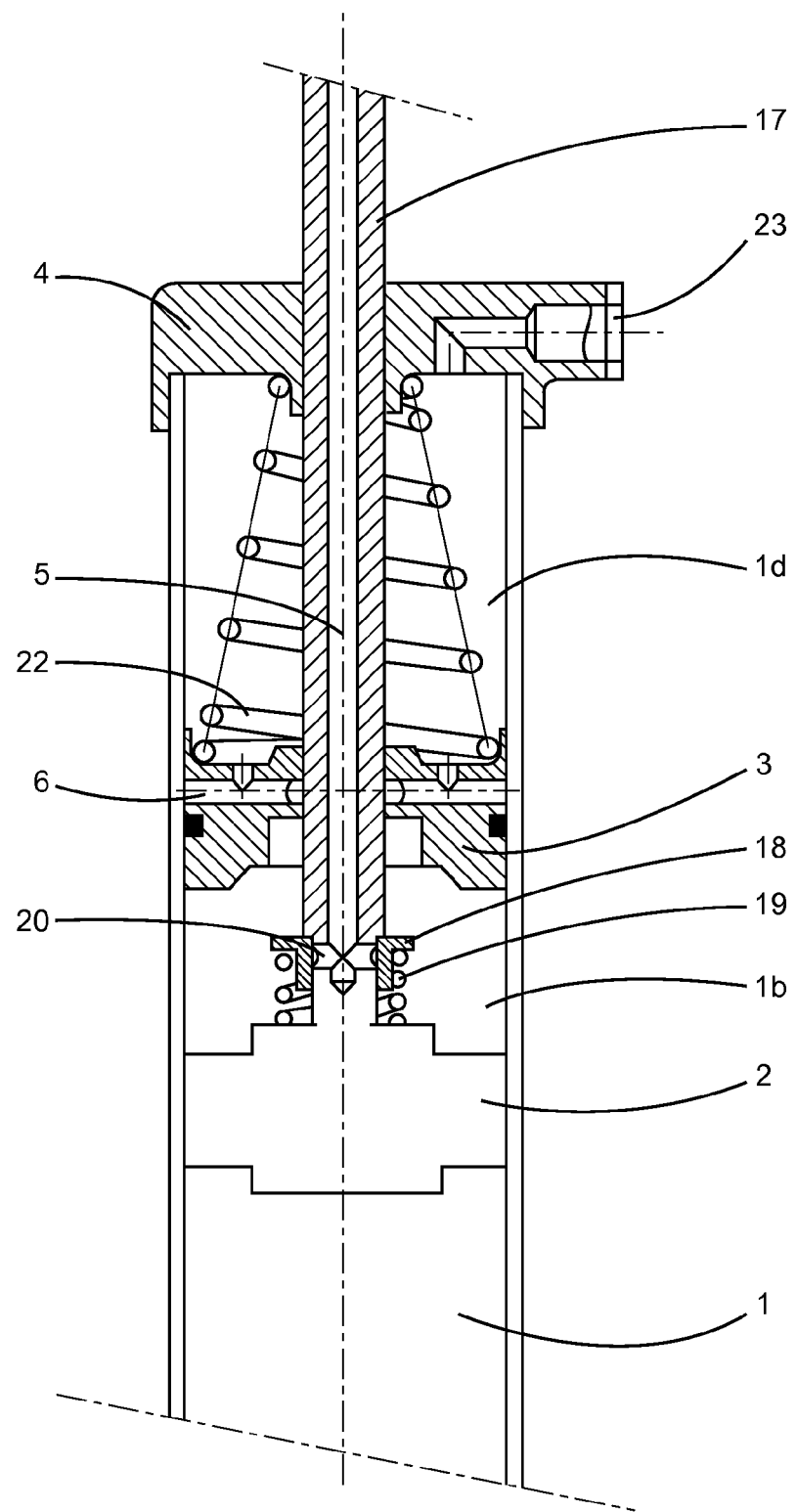
Figure 3:
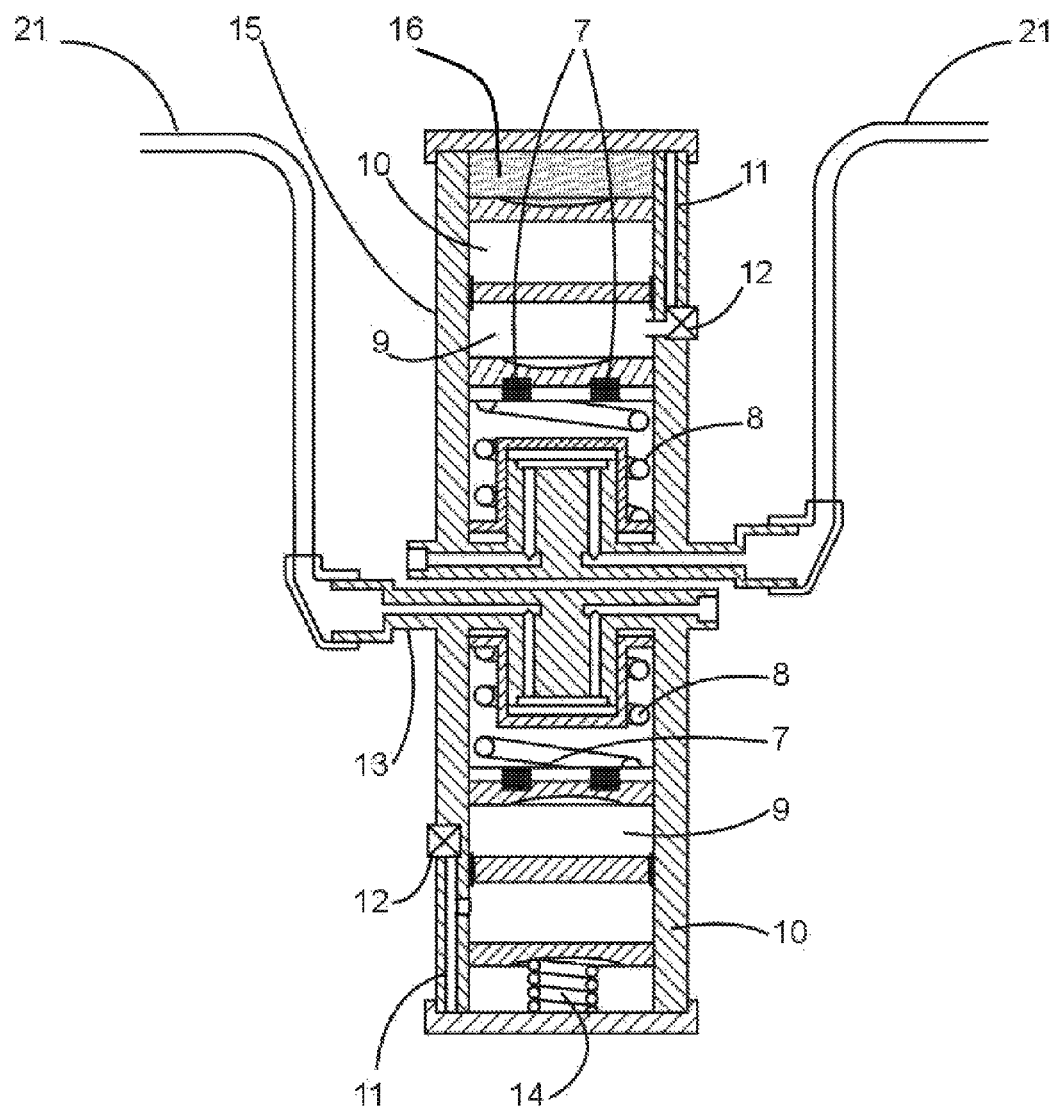
Figure 4:
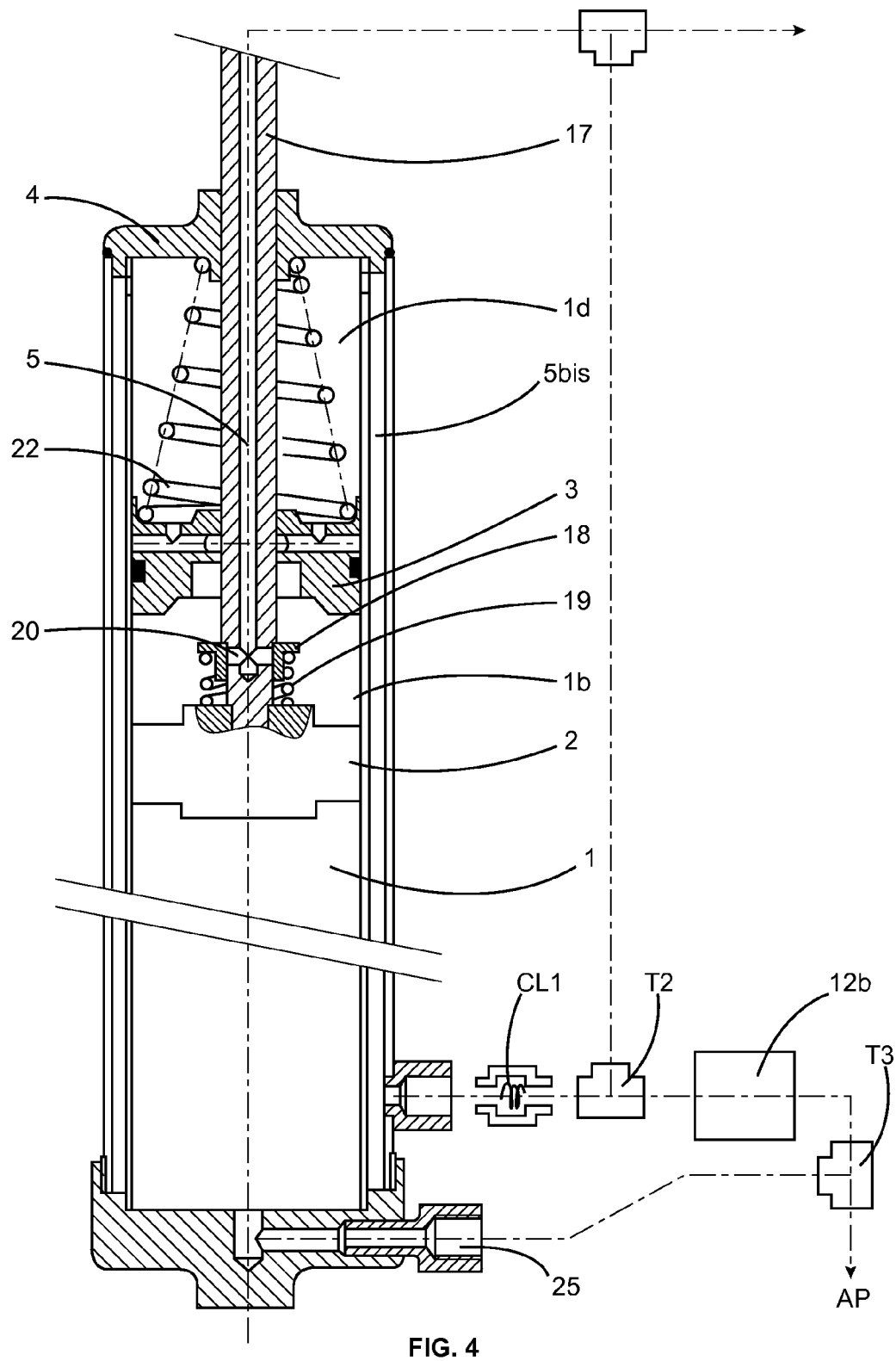
Figure 5:
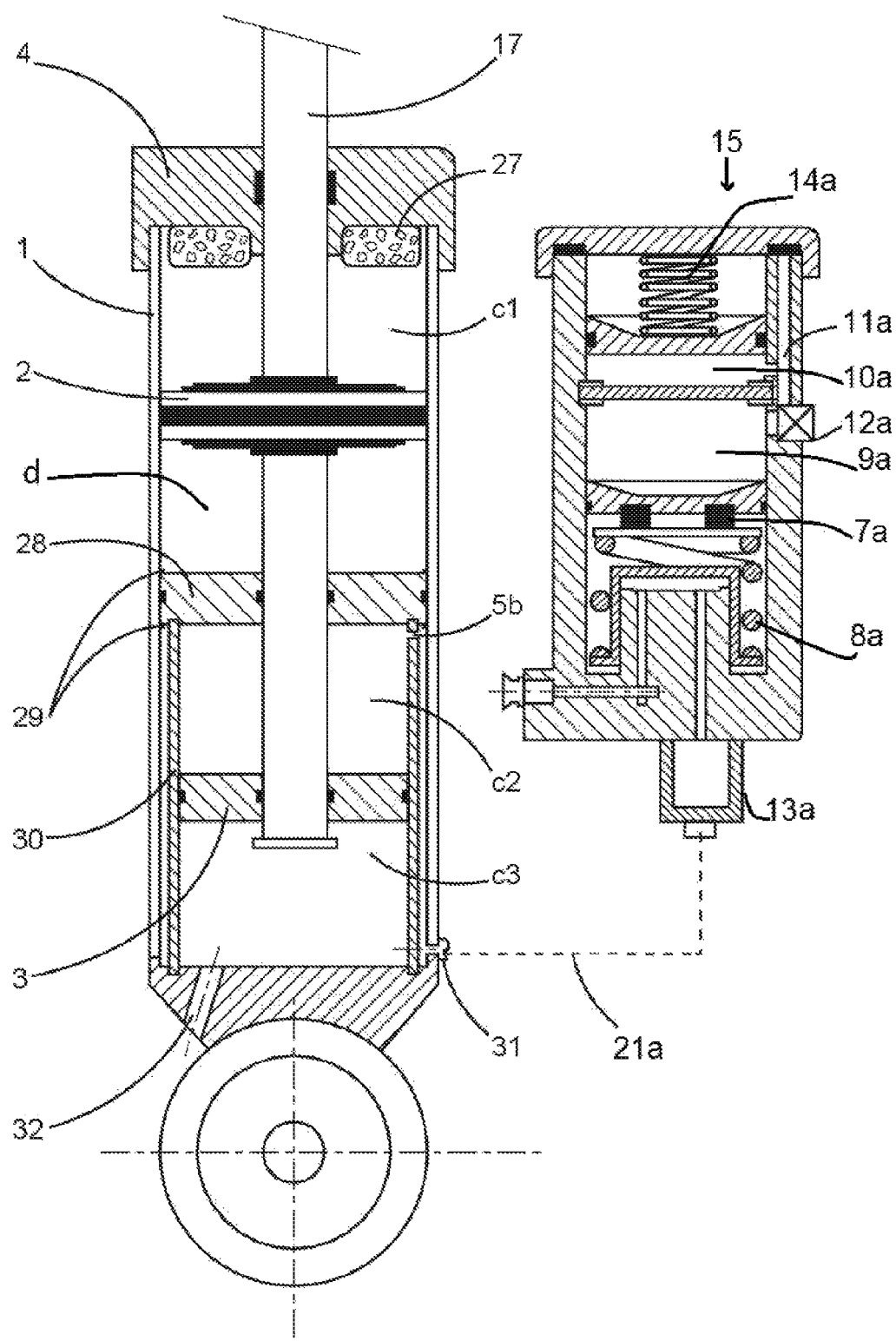
Figure 6:
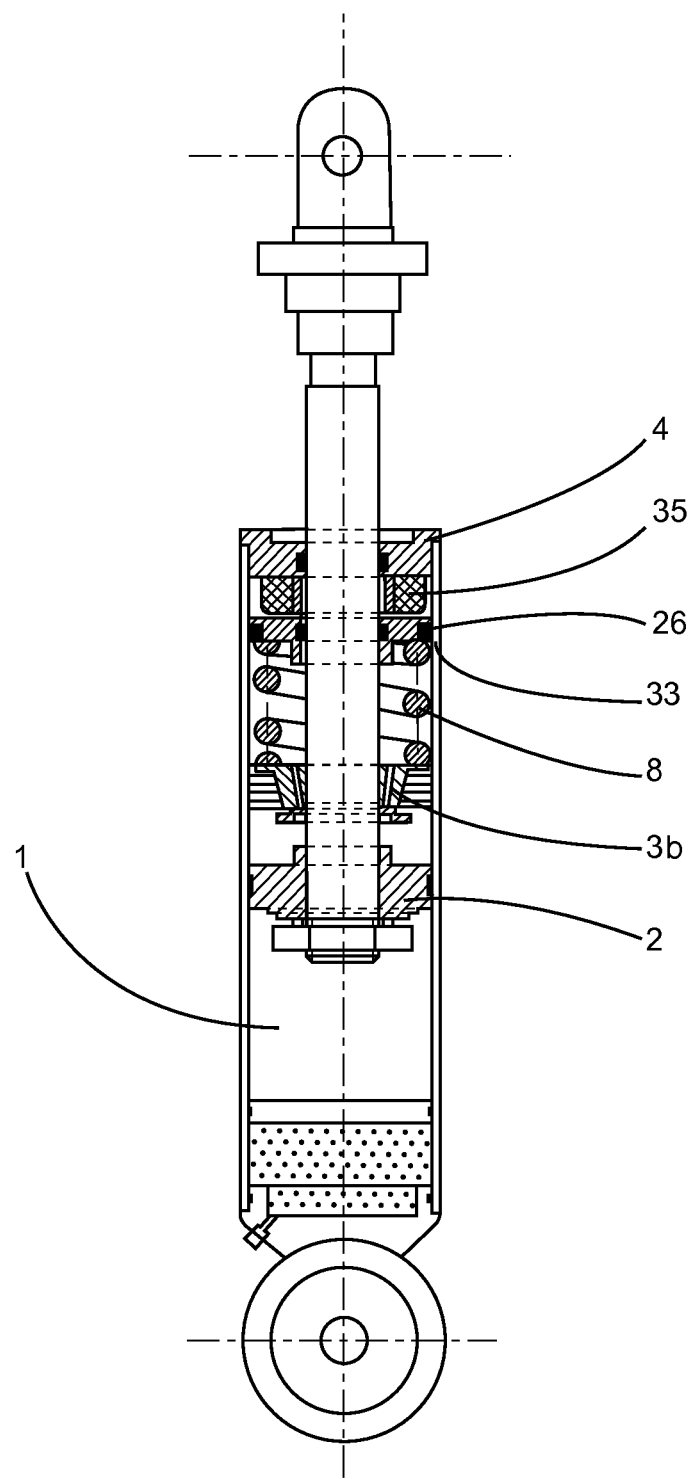
Figure 7:
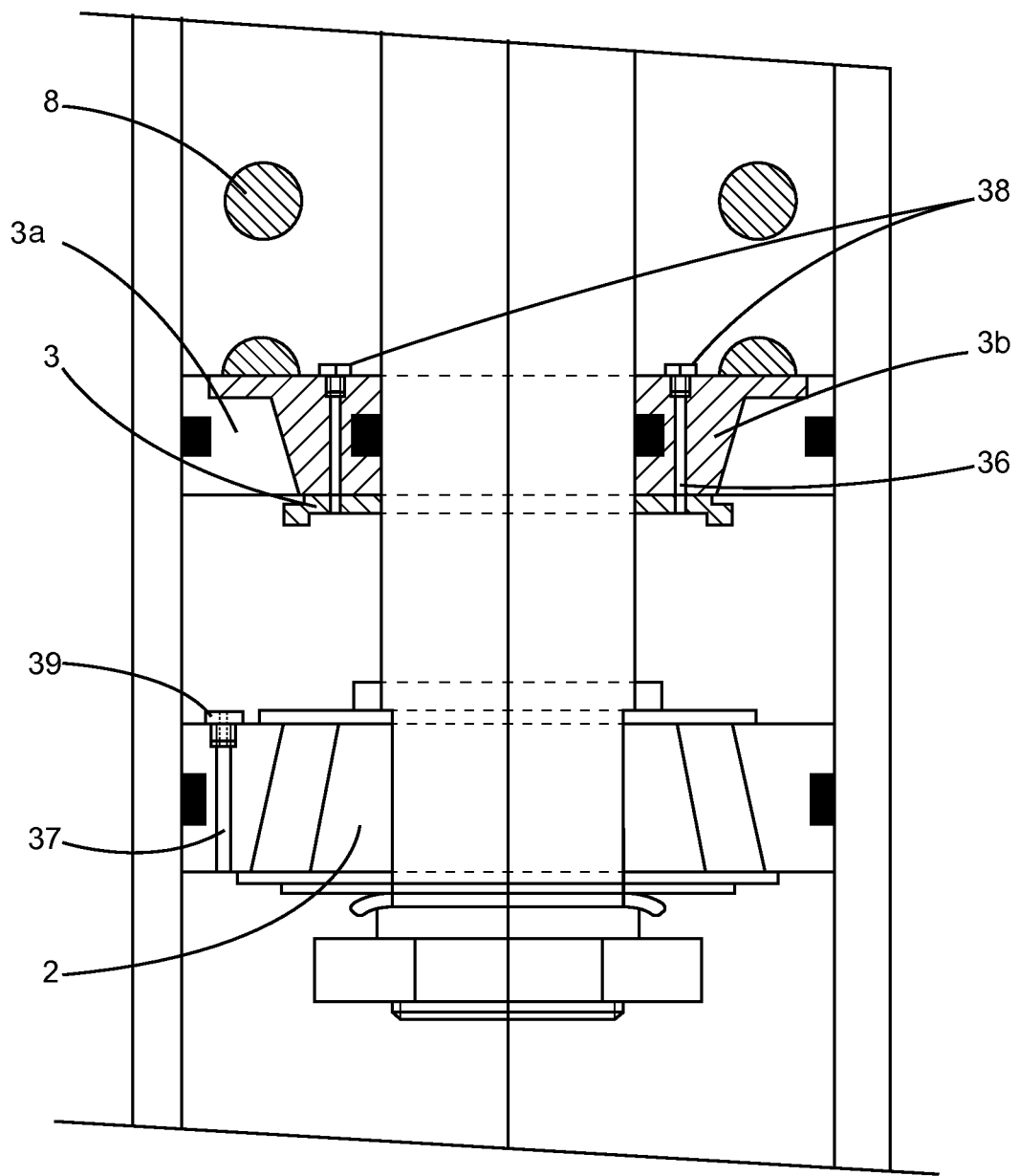
Figures 8, 9:
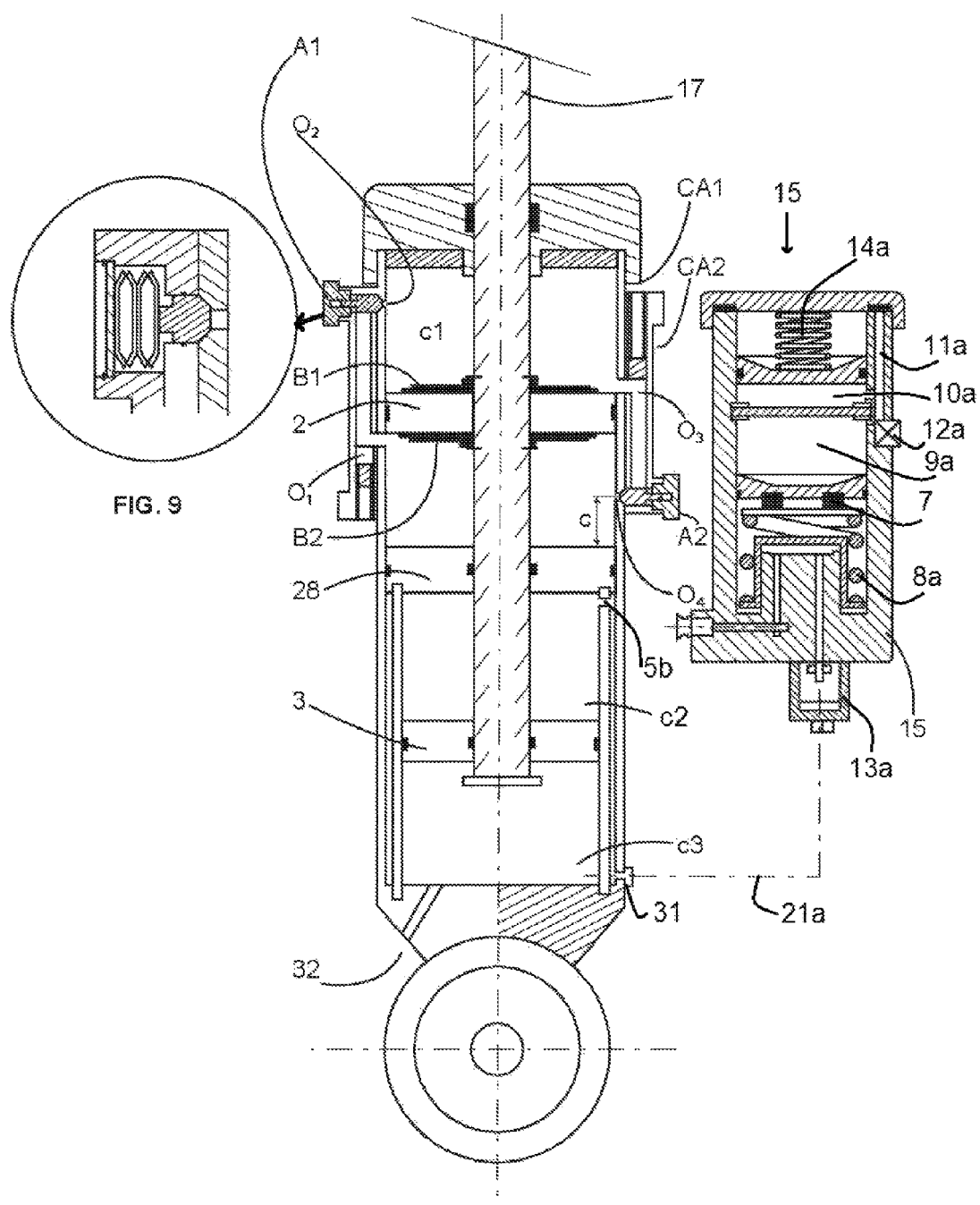

Other characteristics, objects and advantages of the present invention will become apparent upon reading the detailed description which follows and referring to the appended drawings which are given as non restrictive examples and wherein:

FIG. 1 is a schematic representation of a longitudinal section of a damping assembly according to a first embodiment of the present invention, FIG. 2 is a schematic representation, enlarged relative to FIG. 1, of a part of the longitudinal section of a damping assembly according to FIG. 1, FIG. 3 is a schematic representation of a longitudinal section of an expansion module which may be arranged outside a damping assembly of which FIG. 1 shows one of the elements according to the first embodiment of the invention, FIG. 4 is a schematic representation of a longitudinal section of a second embodiment of a damping assembly that contains the solution of FIG. 1 with two pipes, FIG. 5 is a schematic representation of a longitudinal section of a third embodiment, the operation of which is substantially identical with the assemblies described in FIGS. 1, 2 and 4, FIG. 6 is a schematic representation of a longitudinal section of a fourth simplified embodiment of the damping assembly of the present invention making it possible to manage the four sub-phases of damping according to the concept of the four damping phases having distinct values, but without the relocation of the spring return-link stop assembly;

FIG. 7 is a schematic and enlarged detailed representation relative to FIG. 6 of a part of the longitudinal sectional view of a damping assembly according to the fourth simplified embodiment of the present invention, FIG. 8 integrating the solution of FIG. 5 enriched with a schematic representation of a particular valve enabling optimization of damping for each of the 4 work semi-phases of the suspension, FIG. 9 shows one embodiment of the valves.

FIG. 1 shows a damping assembly 1. The damping assembly 1 is shown as an oleo-pneumatic damping device but the present invention is not limited to such a damping device and may be applied to any type of damping device. The damping assembly 1 has a piston 2 movable within the damping assembly 1 by separating said interior into two chambers 1a and 1b.

The piston 2 is connected to a rod 17 extending lengthwise to and inside the damping assembly 1 and exiting said interior through a longitudinal end of the assembly 1. This longitudinal end forms the upper closure 4 of the damping assembly 1. At the other longitudinal end of the damping assembly 1, a gas (for example nitrogen) inlet is provided, in order to control a movable floor which keeps the oil contained in the damping assembly under pressure.

For such an oleo-pneumatic damping assembly, in order to ensure a continuous motion of the piston 2 and the rod 7 assembly, the piston 2 is immersed in a hydraulic fluid, with the interior of the damping assembly 1 containing a fluid volume in a respective chamber 1a or 1b on each side of a piston.

The admission of gas is used for a complementary filling of a containment space 1c located toward the end of the damping assembly 1 positioned opposite the upper closure 4 from which the rod 17 goes out. Gas is confined at the bottom of said containment space 1c by being preferably separated from the hydraulic fluid by a floating separation floor 24.

The damping value will be chosen by one person skilled in the art depending on the objective. Advantageously, the damping assembly 1 has, during the compression, a compression effect as close to zero as possible in order not to introduce an unnecessary braking disruptive to the comfort of the occupants of the vehicle. Regarding the expansion effect, it will be adapted by one person skilled in the art depending on the stiffness chosen to lift the vehicle.

According to the closest state of the art at least two return elements mounted in opposition relative to each other are provided inside a damping assembly. The opposite action of these two return elements gives the two damping devices on the same axle varying stiffness or flexibility in the operation of said assembly.

According to the first embodiment of the invention shown in FIGS. 1 and 2, relocating one of the return elements outside the damping assembly 1, thus forming an expansion module 15, as shown in FIG. 3 is provided for.

According to the invention, the expansion module controls the damping assembly 1 to change, in addition to the stiffness of the suspension, the damping value, but only in the stroke sector from the static position to the fully expanded position. For this purpose, with reference to FIGS. 1 and 2, the damping assembly 1 comprises a floating piston 3 positioned inside the damping assembly 1 between the piston 2 and the upper closure 4 of the damping device 1. The floating piston 3 is combined with a valve system suitable for locking the floating piston 3 when the piston 2 moves away therefrom in the compression direction in the sector from the static position to the full compression of the damping assembly 1.

As can be seen particularly in FIG. 2, the floating piston 3 is mounted free on the piston 2 rod 17 connected to a connecting line 21 for conveying a fluid to an expansion module outside the damping assembly 1. An inner pipe 5 is provided in the piston 2 rod 17 of the damping device 1 to enable the transfer of the volume of fluid displaced by the floating piston 3 when the piston 2 of the damping assembly 1 moves in the expansion sector, i.e. the static position which corresponds to the balanced position of the damping assembly 1 toward the maximum expansion of the damping assembly 1.

According to this first embodiment, the volume of fluid expelled is transferred via the inner hydraulic line 5, to the expansion module, bearing reference number 15 in FIG. 3. The expansion module 15 is thus relocated to the place found the most appropriate, and such module will be described more precisely later.

Other ways to evacuate the fluid volume from the damping assembly 1 to the expansion module 15 shown in FIG. 3 may also be provided for. This can be achieved using a device operating according to the concentric tubes damping device technique of FIG. 4. The valve system must then be adapted according to the technique of fluid volume discharge from inside the damping assembly 1.

The operation of the damping assembly 1 will now be described with particular reference to FIG. 2. In the expansion direction, when moved, the piston 2 rests against the floating piston 3, which produces a pressure on the fluid enabling the fluid contained in the chamber 1d between the floating piston 3 and the upper closure 4 to escape to the expansion module through the inner line 5.

The valve system comprises a first valve formed by a cup 18 held in place by pressure toward the floating piston 3 from a spring 19, said spring 19 being positioned between the piston 2 and the face of the cup 18 facing it. In this position, the cup 18 closes at least one opening 20 of the inner line 17 of the rod 5. Said opening or advantageously two openings 20, is/are used to provide communication between the inner line 5 and the damping assembly 1.

When the piston 2 reaches the static position of the damping assembly 1, the piston 2 comes into contact with the floating piston 3. This contact between the piston 2 and the floating piston 3 pushes the cup 18 up, which counters the action of the spring 19 and clears the opening 20 of the inner line 5. This contact between the piston 2 and the floating piston 3 also places the opening 20 of the inner line 5 opposite a line 6 positioned inside the floating piston 3.

This provides supply for the operation of the return element arranged in the expansion module.

The damping effect appearing in the expansion direction and being a cause of degradation of the comfort in the expansion sector ceases with the contact of the piston head 2 with the floating piston 3. Indeed, the whole column of hydraulic fluid driven by the inner pressure of the damping assembly 1 moves with the floating piston 3 and, for lack of fluid throttling, the damping effect ceases.

A pyramidal spring 22 is provided between the floating piston 3 and the upper closure 4 of the damping assembly 1, the widest base of said pyramidal spring 22 resting against the floating piston 3 and its smallest base resting against the upper closure 4.

This pyramidal spring 22 has a greater stiffness than that of the spring 19 between the piston 2 and the cup 18 to keep the inner line 5 of the rod 17 of the piston head 2 in communication with the channel 6. If necessary, a purge 23 is also provided to drain the fluid from the inner chamber 1d of the damping assembly 1 located between the floating piston 3 and the upper closure 4.

As shown in FIG. 3, the expansion module 15, of which FIG. 3 shows an assembly for an axle with a module for the left wheel and a module for the right wheel, and which relates only to the assembly referred to in FIGS. 1 and 2 comprises on the inside thereof a power piston, which, when receiving the volume of fluid expelled from the damping assembly 1, compresses a return spring 8 by means of a link stop 7. This ensures increased stiffness sought in the expansion phase, one of the characteristics of the damping assembly 1 of the present invention. The link stop 7 is thus insulated from the damping assembly 1 and will operate dry without any risk of degradation.

As shown in FIG. 3, the hydraulic fluid from the damping assembly enters the expansion module 15 through the inlet 13. A connection line 21 connects the inner line 17 of the rod 5 with the inlet 13 of the expansion module 15. A suitable valve system is positioned at the inlet 13 or any other place considered most appropriate by one person skilled in the art.

This valve system may be of the traditional type, or alternately, according to the person skilled in the art choice, be a valve system that works only when slowing down the motion in the compression direction to slow the decompression rate of the return spring 8 of the expansion module 15.

Opposite the power piston, the expansion module 15 has a first and a second successive chamber 9 and 10 interconnected by the line 11, wherein the interconnection with the fluid supply is managed by a manually controlled valve or a solenoid valve 12. This solenoid valve 12 may advantageously be operated in two modes to implement automation for managing the variations in the vehicle load.

The first chamber 9, i.e. the closest one to the stop 7 which operates as the chamber supplied with hydraulic fluid under the control of the solenoid valve 12, the chamber 9 being controlled by a spring 14 or a gas charge 16 opposing the admission into the expansion module 15 of fluid from the damping assembly 1.

In a first mode, the solenoid valve 12 may be connected to the vehicle door automatic closing system, already present on most vehicles or, alternately, with the tachometer of said vehicle. Therefore, as soon as the vehicle with its current load moves with its final trim control, the solenoid valve 12 freezes the optimal positioning of the expansion module 15 forming the return assembly of the damping assembly 1.

This position is obtained by the thrust of the spring 14 or the charge of the pressurized gas 16, for example nitrogen.

Thus, after each stop of the vehicle, the actual load of said vehicle can be taken into account, as well as the decrease of fuel resulting from the progressive consumption thereof.

In a second mode, the solenoid valve 12 is manually controlled and operated by the driver, possibly with a warning signal to facilitate, for low speed not exceeding 20 km/hr, crossing manoeuvres, this especially for vehicles that can go off track.

Two external modules 15, as shown in FIG. 3, may be mounted in tandem to be combined with the left and right damping assemblies of an automobile, with the expansion modules 15 having two symmetrical independent parts each communicating with a respective damping assembly.

In FIG. 3, the expansion module 15 is shown operating on one side with a gas reserve 16 and on the other side with a spring 14. It should be noted that this is illustrative only and that the expansion module 15 may have both a spring 14 and a gas chamber 16 for each of its independent parts respectively connected to a damping assembly.

FIG. 4 shows a third embodiment of the damping assembly according to the present invention. This third embodiment uses the general operation shown in FIGS. 1 and 2, but with an important variation. Indeed, the transfer of fluid between the damping assembly and the expansion module 15 is always via the line 17, but the return of the fluid from the expansion module 15 to the chamber 1d may be through the line 5 or through the line 5a, via a 3-way connection T1, through a valve CL1, thanks to the introduction of the dual-tube technique.

Moreover, this valve CL1 regulates the flow between the module 15 and the chamber 1d, enabling the passage of the flow in the module-chamber 1d direction only, while blocking the passage in the opposite direction. The volume of fluid expelled through the communication orifice 25, resulting from the introduction of the rod 17 in the damping device, will be directed to a conventional pressure accumulator AP, via a 3-way connector T3, a solenoid valve 12a, positioned between the three-way connections T2 and T3 will make it possible to manage the load variations which may occur in the vehicle.

FIG. 5 shows a third embodiment of the present invention adopting the technique using a very specific rod in the damping assembly 1. This embodiment provides for a damping assembly 1, closed in its upper part by a closure 4, four distinct chambers c1, c2, c3 and c4, a damping device rod 17 traversing the four chambers. A main piston 2 carried by the rod 17, is positioned in the chambers c1 and c4 and ensures damping in the expansion direction as in the compression direction in the stroke sector from the fully compressed suspension up to the static position.

The same piston 2 provides a damping effect in the expansion direction as in the compression direction in the stroke sector from the static position to the fully expanded position. As the volume of the rod 17 entering the chamber c1 is fully compensated by the output of the same volume from this chamber, a simple appropriate elastomeric stop 27 is sufficient to absorb the dilatation after significant changes in temperature of the damping assembly. Chambers c2 and c3 are separated from the chamber c1 by a partition 28 fixed in the damping assembly 1 by fastening clips 29, with the chambers c2 and c3 being separated by a floating piston 3.

The architecture 30 of the dual-pipe type is provided for the chambers c2 and c3 to create a line 5a opening through the orifice 31 to an expansion module 15. Between the static position and the fully expanded position, the floating piston 3 will be driven by the traversing rod 17 and expel out of the chamber c3 a volume of oil which will activate the module 15 as it is operated for the techniques described above and illustrated in FIGS. 1 to 4. An air vent completes the damping assembly 32.

FIGS. 6 and 7 show a fourth embodiment of the damping assembly according to the present invention. This fourth embodiment, which in some cases may be particularly advantageous, provides not to relocate the return spring 8-link stop 35 assembly in a remote module, but to isolate the fluid contained within the damping assembly 1. The link stop 35 is present at the upper closure 4 of the assembly 1. In FIG. 6, a first floating piston 26 isolates the link stop 35 from the fluid of the damping assembly 1. In addition, a fastening clip 33 delimits the stroke to the bottom of the floating piston 26. The return spring 8-link stop 35 assembly, constituting the Contractive® concept, is positioned in the upper part of the damping assembly 1 between the floating piston 26 and a second floating piston, provided in three parts 3, 3a, 3b.

In this fourth embodiment, and more precisely as regards the stroke sector from the fully expanded position to the static position of the suspension, the floating piston in three parts 3, 3a, 3b provides the damping of the decompression phase of the return spring 8-link stop 35 assembly. On the other hand, as regards the compression phase of the same return spring 8-link stop 35 assembly, the damping effect of said assembly will be equal to the damping effect that has been chosen for the expansion direction with the valve system of the piston 2, in the stroke sector from the fully compressed position to the static position.

Eventually, and for the sector from the fully compressed position to the static position of the suspension, the piston 2 will provide a damping effect in the expansion direction in relation to the stiffness selected for lifting the vehicle and, in the compression direction, in accordance with that selected by the person skilled in the art. This damping is very close to a null damping effect or a moderate damping.

As will be best seen in FIG. 7, as regards the floating piston consisting of three parts 3, 3a and 3b, the parts 3 and 3a are made integral using fastening screws to enable mounting of the assembly. Part 3, intended to limit the free passage section between 3a and 3b is advantageously perforated to maintain a free passage even when the parts 3 and 3b are in contact. Referring to FIG. 7, at least one free passage 36 having a limited section is provided in the parts 3 and 3a of the floating piston consisting of three parts 3, 3a and 3b even when the parts 3 and 3a are one against the other, in order to manage the decompression of the return spring 8-link stop assembly by an adequate braking. This free passage 36 may be combined with one or more leaf(ves) which may block the passage 36, in an alternative solution also advantageously calibrated using a nozzle 38.

Referring to FIGS. 6 and 7, concerning the operation of the floating piston consisting of three parts 3, 3a and 3b, in the sector between the fully compressed position and the static position, when the up-going piston 2 of the damping assembly 1 comes into contact with the floating piston consisting of three parts 3, 3a, 3b, pushes the floating piston 2 at the level 3 and opens the free passage required between 3a and 3b to ensure the compression of the return spring 8-link stop 35 assembly.

At the end of the compression stroke of the return spring 8-link stop 35 assembly and when the return spring 8 starts decompressing, the part bearing reference number 3a comes in contact with the part 3b of said floating piston by closing the free passage. The floating piston 3, 3a, 3b, due to the pressure exerted by the return spring 8, becomes tight and damping can be achieved by calibrating at least one free passage 36 or by leaves which close the free passage 36 thereby requiring a braking force corresponding to the number and thickness of the leaves.

As can be seen in FIG. 7, at least one free passage 37 is also provided in the piston 2, which can be closed by a nozzle 39 in order to adjust the low speed damping in the compression sector.

FIG. 8 schematically shows an arrangement with a particular valve making it possible to adequately modulate the value of damping for each one of the 4 semi-phases of work of the suspension.

In this figure, a valve system defines the phases, each one being subdivided into two sub-phases or semi-phases. This valve system is integrated in a damping system substantially corresponding to that of FIG. 5 and it comprises, in this example, advantageously, but not restrictively, the expansion module 15 and two chambers c2, c3 at which a piston is 3 movable. The interest of the valve system provided here in reference to FIG. 8 is that it can be sufficient to achieve the means for varying damping.

In one embodiment, the means for varying the damping comprises:
  a fluid bypass circuit with an orifice $0_1$ leading to a chamber c4 and an orifice $0_2$ leading to the other chamber c1. This circuit has a valve A1, preferably with a elastic return system in the closed position. Advantageously, the pressure exerted upon closing the valve A1 is adjustable or displaceable depending on the desired resistance value upon opening the valve A1. Thus constituted, this circuit enables one fluid flow direction and will open only if the two conditions of an upward motion of the piston 2 and a pressure in the chamber capable of opposing the spring, only when the piston 2 is positioned above the orifice $0_1$.
  a fluid bypass circuit with an orifice $0_3$ and an orifice $0_4$ leading to the chamber c1 and to the chamber c4, respectively; a valve A2, for example similar to valve A1. As with the previous valve A1 circuit, the valve A2 creates an asymmetrical operation of the circuit, with a closure in the upward direction of the piston 2 and an opening in the downward direction of the piston 2 when the pressure in the chamber c4 is greater than the resistance to opening of the valve A2.

It should be noted that the two orifices $0_1$ and $0_2$ are so positioned as to define the static position of the piston 2 as shown. Advantageously the piston 2 also has valves B1 and B2 providing two first damping values, in a rising phase of the piston, the other in a descending phase. In the illustrated case, the expansion module 15 and the floating piston 3 add their own action to the stiffness and damping variable.

The damping phases and the action of each means participating in the damping will be detailed below.

The planned four semi-phases are recalled for a better understanding:

Semi-Phase 1: Fully compressed suspension→static position.

Semi-Phase 2: Static position→fully expanded suspension.

Semi-Phase 3: Fully expanded suspension→static position.

Semi-Phase 4: Static position→fully compressed suspension.

The conventional valve for the expansion phase and for the compression phase, which the piston of a damping device is usually provided with, is kept with the adjustment valves B1 & B2; the body of the damping device CA1 is surrounded with a second additional body CA2—of the dual-pipe type.

Semi-Phase 1:

To ensure the value of the damping selected in the expansion direction between the fully compressed position and the static position of the suspension, the control valve B2 will ensure the correct value of damping for this semi-phase.

Semi-Phase 2:

Between the static position and the fully expanded position, an orifice $0_1$, located appropriately, just below the position corresponding to the static position of the suspension, is created to provide communication between the chamber c1 with the chamber c4 via the orifice $0_2$ leading to the chamber c1, the inlet of which is provided with a control valve A1 for a fluid flow in one direction, thereby reducing the damping value for this half-phase.

In the chamber c2, a honeycomb pad 40 may line the upper wall of the chamber to absorb the changes in the fluid volume according to the temperatures.

Semi-Phase 3:

Still in the same logic and to ensure the damping value in the compression direction between the fully expanded position and the static position, the control valve B1—combined with the module control valve CRM—controls the decompression rate of the return spring in the module—controls the overall value of damping.

Semi-Phase 4:

Still in the compression direction and pursuing its stroke between the static position and the level carefully selected by one person skilled in the art to position the control valve A2, the latter valve A2 will optimize the damping value during phase 4. However, for the residual stroke which will vary according to the choice of the person skilled in the art—see dimension c corresponding to the space created between the position of the valve A2 and up to the end of the compression stroke of the suspension—the control valve B1 will adequately and more aggressively control the end of the compression stroke with the desired damping.

The dimension c preferably finds its match between the orifice $0_2$ and the upper end of the damping assembly 1.

FIG. 9 shows a possible embodiment for one or more valves. This solution is easily industrialized and avoids the use of coil springs. Adjusting the closing stiffness of the valve is provided by elastic members such as washers.

Eventually, an arrangement may be provided with an electronically controlled damping. This arrangement provides for a displacement sensor directly or indirectly measuring the displacement values of the piston, these values being transmitted to the computer managing the damping according to the values complying with the damping criteria which provide for damping in the expansion direction and damping in the compression direction for each one of the sub-phases, from the fully compressed position to the rest position and from the rest position to the fully expanded position.

In this embodiment, not shown in the figures, a displacement sensor may be provided in the damping assembly or parallel to said damping assembly that transmits a computer managing the appropriate damping values to be chosen for the four work sectors considered.

For example, a comparative table is given here, that shows the damping values chosen according to certain stiffness values. For this example, these values are to be considered for a single speed of 0.3 meters/second with stiffness borrowed from an existing mass-produced vehicle, i.e. for a conventional vehicle with a stiffness of 5 kN/mm in the compression phase and in the expansion phase and, for the same damping device in the Contractive® version, with a stiffness in the expansion phase increased to 15 daN/mm. The comparison is made between an automobile provided with conventional damping assemblies, a vehicle provided with Contractive® damping assemblies and eventually with damping assemblies according to the present invention under the name AVS 4. The ideal theoretical values for a physically optimized damping are shown between brackets.

| Damping values for 0.3 m/sec and stiffness values for the considered mass-produced vehicle | Traditional suspension | "Conventional" Contractive | 4 AVS suspension |
| --- | --- | --- | --- |
| Expansion work sector Damping value in the expansion direction (Semi-phase 2) Considered stiffness | 178 kg (0 kg) 5 daN/m | 178 kg (0 kg) 15 daN/m | 0 kg (0 kg) 15 daN/m |
| Expansion work sector Damping value in the compression direction (Semi-phase 3) Considered stiffness | 80 kg (178 kg) 5 daN/m | 80 kg (308 kg) 15 daN/m | 308 kg (308 kg) 15 daN/m |
| Compression work sector Damping value in the expansion direction (Semi-phase 1) Considered stiffness | 178 kg (178 kg) 5 daN/m | 178 kg (178 kg) 5 daN/m | 178 kg (178 kg) 5 daN/m |
| Compression work sector Damping value in the compression direction (Semi-phase 4) Considered stiffness | 80 kg (0 kg) 5 daN/m | 80 kg (0 kg) 5 daN/m | 80 kg (0 kg) 5 daN/m |

The invention also relates to a method for the suspension of an automobile, in the broadest sense, i.e. any vehicle with suspensions moved by its own means, this method using such a damping assembly, this assembly being active about a static position in both the compression and expansion phase, the suspension having a different stiffness or flexibility between the stroke sector of the suspension from the static position to the fully compressed position and the stroke sector of the suspension from the static position to the fully expanded position, in which method a phase of modifying the damping value with distinct values for the compression direction and the expansion direction for each sector of work of the damping assembly is provided, depending on whether work is carried out between the static position of the suspension and the fully compressed position or between the static position of the suspension and the fully expanded position, i.e. the provision of four different damping values for four phases of work instead of two damping values for four phases of work, as is the case for the traditional suspensions.

This can be seen in the above-mentioned table. For the expansion sub-phase in the expansion work sector, the damping value is reduced to 0 kg whereas it was 178 kg for a traditional suspension or a suspension of the Contractive® type. Similarly, for a compression in the expansion work sector, the damping value is increased to 308 kg, whereas it was 80 Kg for a traditional suspension or a suspension of the Contractive® type. Eventually, for a compression sub-phase in the compression work sector, the damping value is reduced to 0 kg, whereas it was 80 Kg for a traditional suspension or a suspension of the Contractive® type.

In the case of the table, three sub-phases, i.e. the expansion sub-phase in the expansion work sector, the compression sub-phase in the expansion work sector and the compression sub-phase in the compression work sector are thus modified damping values.

However, this is not restrictive and another combination of sub-phases with modified values is also possible as well as having only one sub-phase with a modified damping value.

It is also possible, during the same compression or expansion phase respectively, to have a damping value of the damping assembly for an action of the damping assembly between the static position and the maximum compression or respectively expansion position different from the damping value for the reverse action Thus, as can be seen in the above-mentioned table, for illustrative and not restrictive purposes, the damping value for the expansion sub-phase in an expansion work sector is modified to be equal to 0 kg and is different from the damping value for the compression sub-phase in an expansion work sector which is modified to be equal to 308 kg. Similarly, the damping value for the compression sub-phase in a compression work sector is modified to be equal to 0 kg and is different from the damping value for the expansion sub-phase in a compression sector which is equal to 178 kg.

Other changes may be brought to the damping value for at least one sub-phase of a compression or expansion sector, and one or more sub-phases may be modified.

Advantageously, the return spring-link stop assembly is adjusted according to the load of the vehicle at a given time.

Advantageously, the damping is electronically controlled.

The invention is not limited to the embodiments described, but extends to all the embodiments within the spirit thereof.

REFERENCES

1. Damping assembly
1a. Chamber
1b. Chamber
1c. Containment space
1d. Chamber
2. Piston
3. Floating piston
3a. Second part of the floating piston
3b. Third part of the floating piston
4. Upper closure
5. Inner line
6. Channel
7. Link stop
8. Return spring
9. First chamber
10. Second chamber
11. Line
12. Solenoid valve
12b. Solenoid valve
13. Inlet
14. Spring
15. Expansion module
16. Pressurized gas
17. Rod
18. Cup
19. Spring
20. Opening
21. Connecting pipe
22. Pyramidal spring
23. Purge
24. Floating separation floor
25. Communication port
26. Floating piston
27. Elastomeric stop
28. Partition
29. Clips
30. Architecture
31. Port
32. Air vent
33. Fastening clip
35. Link stop
36. Free passage
37. Free passage
38. Nozzle
39. Nozzle
40. Buffer
Valve CL1
c1 to c4. Chambers
T1. 3-way fitting
T2. 3-way fitting
T3. 3-way fitting
AP. pressure accumulator
A1, A2. valve
B1, B2. valve
CA1. Body
CA2. additional body
$0_1$, $0_2$ Port
$0_3$, $0_4$ Port
CRM Module valve control

The invention claimed is:

1. A damping device comprising:
a damping assembly filled with hydraulic fluid;
a rod; and
a piston provided on an interior of the damping assembly and connected to the rod, with the piston and the rod being movable from a static position in one of a compression direction and an expansion direction to provide a damping function,
wherein the damping assembly is configured to produce:
a compression phase when the piston is located in a compression zone, with the piston in a first position on one side of the static position,
wherein the piston is in one of a compression sub-phase of the compression phase and an expansion sub-phase of the compression phase when the piston is moving from the static position toward a maximum compression position and is moving from the maximum compression position toward the static position, respectively, and
an expansion phase when the piston is located in an expansion zone, with the piston in a second position on another side of the static position,
wherein the piston is in one of an expansion sub-phase of the expansion phase and a compression sub-phase of the expansion phase when the piston is moving from the static position toward a maximum expansion position and is moving from the maximum expansion position toward the static position, respectively, wherein a damping value of the compression sub-phase of the compression phase differs from a damping value of the expansion sub-phase of the compression phase, and wherein a damping value of the expansion sub-phase of the expansion phase differs from a damping value of the compression sub-phase of the expansion phase.

2. The damping device according to claim 1, further comprising an expansion module configured to modify both a stiffness value and the damping values during each sub-phase.

3. The damping device according to claim 2, wherein the expansion module comprises a first chamber and a second chamber interconnected by a duct, wherein supply of hydraulic fluid in the duct is controlled by a solenoid valve, and wherein said first chamber is subjected to a spring or a gas load opposing the hydraulic fluid entering the expansion module from the damping assembly to maintain the first chamber under pressure.

4. The damping device according to claim 3, wherein the damping assembly comprises a third chamber and a fourth chamber arranged between the piston and one end of the damping assembly, and between the piston and the partition, respectively.

5. The damping device according to claim 4, further comprising:

a first fluid bypass circuit between the third chamber and the fourth chamber, said circuit comprising a first valve configured to enable fluid passage in a first direction of motion of the piston and to inhibit the fluid passage in a second direction of motion of the piston; and a second fluid bypass circuit between the third chamber and the fourth chamber, said circuit comprising a second valve configured to enable fluid passage in the second direction and to inhibit fluid passage in the first direction.

6. The damping device according to claim 5, wherein the first and second fluid bypass circuits are defined by an outer wall of a first cylinder, and an inner wall of the first cylinder which defines the first chamber, the second chamber and the third chamber.

7. The damping device according to claim 5, wherein the first and second fluid bypass circuits each have an orifice leading to respective chambers of the piston.

8. The damping device according to claim 5, wherein the first and second fluid bypass circuits each have an orifice leading to respective chambers, positioned at a predetermined distance from the end the damping assembly and of the closing wall, respectively.

9. The damping device according to claim 5, wherein the piston comprises two valves, each configured to enable one-way passage of fluid through the piston.

10. The damping device according to claim 1, wherein the damping assembly comprises a floating piston positioned on said rod between the piston and one end of the damping assembly, said floating piston being movable along said rod and defining a first inner chamber directed toward said one end in the damping assembly, and wherein the damping assembly further comprises a partition arranged between the piston and the floating piston, creating a second inner chamber between the floating piston and the partition, with the position of the floating piston configured to vary pressure of the hydraulic fluid to modify both the stiffness value and the damping value.

11. The damping device according to claim 10, further comprising an expansion module having a fluid inlet connected to an orifice in the first inner chamber with said inlet acting on a power piston which compresses a return spring via a link stop, with a decompression rate of the return spring being controlled by a valve regulating the expansion module.

12. An automobile including a damping device according to claim 11, and comprising:

at least one pre-stressing device, wherein the expansion module is combined with at the least one pre-stressing device to control automatic adjustment of a pre-stressing value of the expansion module according to actual load of the automobile at a given time, and wherein the at least one pre-stressing device is automatically controlled by one of automatic closing of doors of the automobile and a tachometer of the automobile.

13. The damping device according to claim 1, further comprising a displacement sensor configured to measure displacement of the piston.

14. A method for providing a damping function to control suspension of a wheel of an automobile, the method comprising:

applying damping;

selecting a damping value of a compression sub-phase of a compression phase that differs from a damping value of an expansion sub-phase of the compression phase; and selecting a damping value of an expansion sub-phase of an expansion phase that differs from a damping value of a compression sub-phase of the expansion phase, wherein the damping is applying by operating a damping device comprising a damping assembly filled with a hydraulic fluid, a rod, and a piston provided on an interior of the damping assembly and connected to the rod, with the piston and the rod being movable from a static position in one of a compression direction and an expansion direction to provide a damping function, wherein the applying comprises:

producing the compression phase when the piston is located in a compression zone, with the piston in a first position on one side of the static position, wherein the piston is in one of the compression sub-phase of the compression phase and the expansion sub-phase of the compression phase when the piston is moving from the static position toward a maximum compression position and is moving from the maximum compression position toward the static position, respectively, and producing the expansion phase when the piston is located in an expansion zone, with the piston in a second position on another side of the static position, wherein the piston is in one of the expansion sub-phase of the expansion phase and the compression sub-phase of the expansion phase when the piston is moving from the static position toward a maximum expansion position and is moving from the maximum expansion position toward the static position, respectively.

15. The method according to claim 14, wherein a damping value for an action during a compression phase differs from a damping value for a reverse action of a corresponding expansion phase.

16. The method according to claim 14, wherein the damping assembly is electronically controlled.

17. The method according to the claim 14, further comprising transmitting values of displacement of the piston from a displacement sensor to a computer configured to determine damping values for each sub-phase.

18. A damping device comprising:
a damping assembly filled with hydraulic fluid;
a rod; and
a piston provided on an interior of the damping assembly and connected to the rod, with the piston and the rod being movable from a static position in one of a compression direction and an expansion direction to provide a damping function,
wherein the damping assembly is configured to produce a compression phase when the piston is located in a compression zone, with the piston in a first position on one side of the static position,
wherein the piston is in one of a compression sub-phase of the compression phase and an expansion sub-phase of the compression phase when the piston is moving from the static position toward a maximum compression position and is moving from the maximum compression position toward the static position,
wherein the piston is in an expansion phase when the piston is located in an expansion zone, with the piston in a second position on another side of the static position,
wherein the piston is in one of an expansion sub-phase of the expansion phase and a compression sub-phase of the expansion phase when the piston is moving from the static position toward a maximum expansion position and is moving from the maximum expansion position toward the static position, respectively,
wherein a damping value of the compression sub-phase of the compression phase differs from a damping value of the expansion sub-phase of the compression phase,
wherein a damping value of the expansion sub-phase of the expansion phase differs from a damping value of the compression sub-phase of the expansion phase,
wherein the damping assembly comprises:
  a floating piston positioned on said rod between the piston and one end of the damping assembly, said floating piston being movable along said rod to define a first inner chamber directed toward said one end in the damping assembly; and
  a partition arranged between the piston and the floating piston, creating a second inner chamber between the floating piston and the partition, with the position of the floating piston configured to vary pressure of the hydraulic fluid to modify both the stiffness value and the damping value, and
wherein the damping device further comprises an expansion module having a fluid inlet connected to an orifice in the first inner chamber, said inlet configured to act on a power piston which compresses a return spring via a link stop, with a decompression rate of the return spring being controlled by a valve regulating the expansion module.

19. A damping device comprising:
a damping assembly filled with hydraulic fluid;
a rod;
a displacement sensor;
a controller; and
a piston provided on an interior of the damping assembly and connected to the rod, with the piston and the rod being movable from a static position in one of a compression direction and an expansion direction to provide a damping function,
wherein the damping assembly is configured to produce a compression phase when the piston is located in a compression zone, with the piston in a first position on one side of the static position,
wherein the piston is in one of a compression sub-phase of the compression phase and an expansion sub-phase of the compression phase when the piston is moving from the static position toward a maximum compression position and is moving from the maximum compression position toward the static position,
wherein the piston is in an expansion phase when the piston is located in an expansion zone, with the piston in a second position on another side of the static position,
wherein the piston is in one of an expansion sub-phase of the expansion phase and a compression sub-phase of the expansion phase when the piston is moving from the static position toward a maximum expansion position and is moving from the maximum expansion position toward the static position, respectively,
wherein a damping value of the compression sub-phase of the compression phase differs from a damping value of the expansion sub-phase of the compression phase,
wherein a damping value of the expansion sub-phase of the expansion phase differs from a damping value of the compression sub-phase of the expansion phase;
wherein the displacement sensor is configured to transmit values of displacement of the piston to the controller, with the controller configured to determine the damping value of the compression sub-phase of the compression phase, the damping value of the expansion sub-phase of the compression phase, the damping value of the expansion sub-phase of the expansion phase and the damping value of the compression sub-phase of the expansion phase.

* * * * *

UNITED STATES PATENT AND TRADEMARK OFFICE
CERTIFICATE OF CORRECTION

PATENT NO. : 9,458,906 B2  
APPLICATION NO. : 14/232420  
DATED : October 4, 2016  
INVENTOR(S) : Mauro Bianchi It is certified that error appears in the above-identified patent and that said Letters Patent is hereby corrected as shown below:

On the Title Page

Item (73) Assignee: remove "Astron Flamm Safety (FR)".

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*